April 14, 1959 W. K. SQUIRES 2,882,337

REGULATION SYSTEM FOR TELEVISION
RECEIVER SWEEP CIRCUITS

Filed Aug. 12, 1954

INVENTOR.
William K. Squires
BY
Mason, Kolehmainen, Rathburn & Wyss
Att'ys

United States Patent Office 2,882,337

Patented Apr. 14, 1959

2,882,337

REGULATION SYSTEM FOR TELEVISION RECEIVER SWEEP CIRCUITS

William K. Squires, Snyder, N.Y., assignor to Sylvania Electric Products, Inc., a corporation of Massachusetts Application August 12, 1954, Serial No. 449,454

7 Claims. (Cl. 178—5.8)

Figure 1:
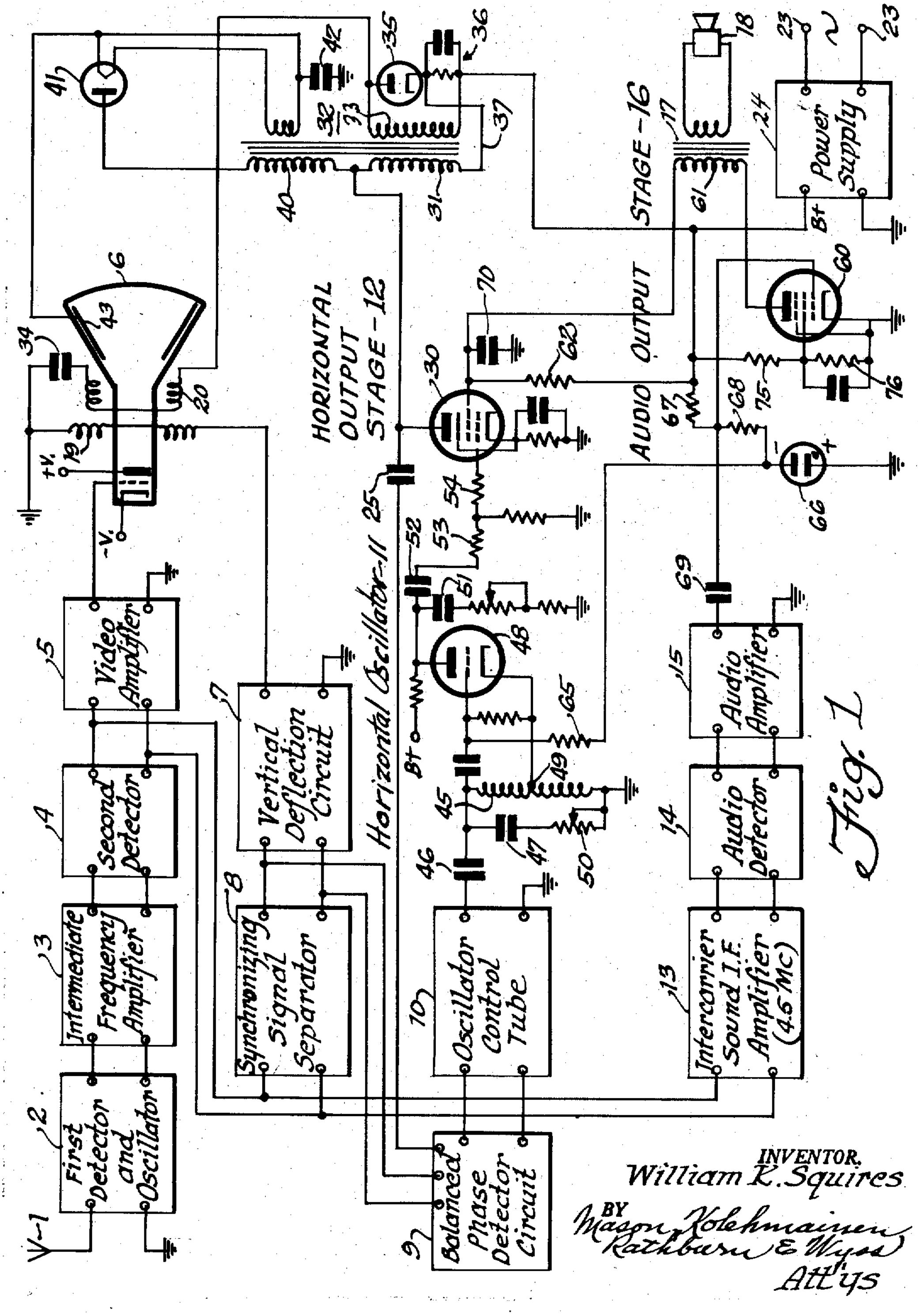

The present invention relates to television receivers, more particularly to the horizontal scanning and high voltage producing portions of a television receiver, and the invention has for an object the provision of an extremely simple regulation system for the horizontal scanning circuit of the receiver whereby the high voltage produced for the television picture tube is held substantially constant and the deleterious effects of line voltage fluctuations are minimized.

In conventional television receivers the horizontal output stage, which develops a horizontal scanning wave suitable for deflecting the electron beam horizontally across the face of the picture tube is also employed to develop a high voltage, of the order of 12,000 volts, which is applied to the accelerating anode of the picture tube. This type of high voltage system is commonly called a fly back or inductive kick high voltage system since high voltage pulses are developed in the inductive scanning circuit during the rapid fly back or retrace interval which separates each horizontal line and during which intervals the electron beam is brought back to the left hand side of the picture tube. The horizontal output tube is energized by a conventional low voltage power supply which rectifies the 60 cycle power line voltage and develops a substantailly unidirectional voltage, of the order of 250 volts, which is used to energize the anode and screen grid of the horizontal output tube. However, the power line voltage may vary considerably depending on load conditions and location with the result that the energizing potential impressed upon the horizontal output tube may vary from 220 to 300 volts. These variations in energizing potential produce marked changes in the high voltage developed by the inductive kick high voltage supply and for a change in line voltage of from 220 to 300 volts the accelerating anode potential may, for example, vary from 9,700 volts to 14,500 volts. When the accelerating anode potential changes due to line voltage variations many undesirable effects are produced which ar noticeable in the reproduced picture. Thus, changes may occur in the brightness of the picture, in the focus adjustment, and in the beam bender adjustment. In some instances changes in the size of the reproduced picture also result. In many television receivers a power conservation system is employed in the horizontal output stage to develop a so-called boosted B+ voltage which may be used to energize certain component circuits of the receiver, and line voltage fluctuations cause corresponding variations in the boosted B+ voltage with the result that changes in the black level of the picture occur and further defocusing results.

While certain arrangements heretofore proposed have attempted to minimize the effects of line voltage fluctuations by stabilizing or regulating the horizontal output tube, these arrangements have generally required the use of a special voltage regulator tube to achieve good regulation with the result that the cost of the receiver is substantially increased. Accordingly, it is another object of the present invention to provide a new and improved regulation system for the horizontal output tube of a television receiver which requires substantially no increase in the cost of the receiver while minimizing the effects of line voltage over a wide range of values.

It is a further object of the present invention to provide a new and improved regulation system for the horizontal output tube of a television receiver wherein one of the signal translating stages of the receiver also functions as a D.C. amplifier to provide a regulating control for the horizontal output tube without appreciably increasing the complexity or cost of the receiver.

It is a still further object of the present invention to provide a new and improved regulation system for the horizontal output tube of a television receiver wherein the audio output tube of the receiver also functions as a D.C. amplifier to provide a regulating control for the horizontal output tube and a bias or reference potential for the audio output tube is derived from the horizontal oscillator of the receiver which is substantially independent of line voltage variations.

Briefly, in accordance with one phase of the invention, the audio output tube of the television receiver is employed as a D.C. amplifier to control the screen grid potential of the horizontal output tube in accordance with changes in the energizing potential supplied to the horizontal output tube due to line voltage fluctuations. Since the control function of the audio output tube involves a substantially unidirectional voltage, the controlling action of the audio output tube does not interfere with its normal function of amplifying the sound signal which accompanies the received picture signal. As a result, the accelerating anode potential which is developed from the horizontal output tube is held substantially constant despite large fluctuations in line voltage so that the reproduced picture does not undergo changes in brightness and focus when line voltage fluctuations occur. In a preferred form of the invention, a bias potential which is substantially independent of line voltage fluctuations is derived from the horizontal scanning oscillator of the television receiver and is employed as a reference potential for the control grid of the audio output tube so that the proper grid bias level for audio amplification may be obtained while permitting the audio output tube to act as a D.C. amplifier for changes in line voltage.

The invention, both as to its organization and method of operation, together with further objects and advantages thereof, will best be understood by reference to the following specification, taken in connection with the accompanying drawing in which the single figure thereof is a schematic diagram of a television receiver, partly in block diagram form, which embodies the features of the present invention.

Referring now to the drawing, the system illustrated therein comprises a modulated carrier wave television receiver of the superheterodyne type including an antenna system 1 connected to a first detector and oscillator 2, to which are connected, in cascade relation in the order named, an intermediate frequency amplifier 3, a second detector 4, a video amplifier 5, and a cathode ray tube viewing device 6. A vertical deflection circuit 7 is connected to the output of the second detector 4 through a synchronizing signal separator circuit 8 and the output of the synchronizing signal separator circuit 8 is also supplied to the horizontal deflection system which includes a balanced phase detector circuit 9, an oscillator control tube 10, a horizontal scanning oscillator 11 and a horizontal output stage 12, to be described in more detail hereinafter. The output of the second detector 4 is also supplied to an intercarrier sound IF amplifier 13, the output of which is connected to an audio detector 14 which supplies the detected sound signal to an audio amplifier 15, an audio output stage 16 supplying the sound signal through the audio output transformer 17 to the loudspeaker 18.

The units 1 to 10, inclusive, and 13 to 15, inclusive, may all be of conventional well known construction so that a detailed description thereof is unnecessary herein. Referring briefly, however, to the operation of the above described system as a whole, television signals intercepted by the antenna circuit 1 are applied to the oscillator-detector 2 wherein they are converted into intermediate frequency signals which are in turn selectively amplified in the intermediate frequency amplifier 3 and are delivered to the second detector 4. The modulation components of the received signal are detected in the second detector 4 and are supplied to the video frequency amplifier 5 wherein they are amplified and impressed upon the control grid of the cathode ray tube 6. The detected modulation components are also supplied to the synchronizing signal separator circuit 8 wherein the vertical and horizontal synchronizing signals are separted from the video signal and from each other, the vertical synchronizing signal being connected to the vertical deflection circuit 7 so as to develop a vertical scanning wave in the vertical scanning coils 19 which surround the neck of the cathode ray tube 6. The horizontal synchronizing signal is impressed upon the balanced phase detector circuit 9 and the output of the circuit 9 is impressed upon the oscillator control tube 10 which in turn controls the frequency of the horizontal scanning oscillator 11, a feedback signal from the horizontal output stage 12 being coupled through the condenser 25 to the phase detector circuit 9 to permit a comparison of the phase relationship between the output and synchronizing signals. An intercarrier sound signal is also derived from the second detector 4 and is amplified in the 4.5 mc. IF amplifier 13 and supplied to the audio detector 14. The audio signal from the detector 14 is amplified in the audio amplifier 15 and raised to a suitable power level in the output stage 16 to actuate the voice coil of the speaker 18. A conventional power supply 24 is employed to develop a B+ energizing potential which is employed to energize the output stages 12 and 16, as well as the other portions of the receiver, the power supply 24 being connected to a conventional 60 cycle power line 23 which may be subject to considerable fluctuations and variations.

Referring now more particularly to the portions of the receiver which relate to the present invention, the horizontal output tube 30 receives a suitable shaped saw tooth scanning wave from the horizontal scanning oscillator 11 and the anode of the tube 30 is connected to one end of the primary winding 31 of a horizontal deflection and high voltage transformer 32. The horizontal scanning wave which is developed in the secondary winding 33 of the transformer 32 is supplied to the horizontal deflection yoke 20 which surrounds the neck of the cathode ray tube 6, the other end of the yoke 20 being connected to ground through the condenser 34. A damping diode 35 and filter network 36 are connected across the winding 33 so as to develop a boosted B+ voltage on the conductor 37 which is connected to the other end of the primary winding 31 so as to supply a relatively high energizing potential to the anode of the horizontal output tube 30. The transformer 32 is provided with a tertiary winding 40 which is employed to generate the high vltage, one end of the winding 40 being connected to the anode of the tube 30 and the other end of the winding 40 being connected to the anode of a high voltage rectifier tube 41 so as to produce an accelerating anode potential across the filter condenser 42 which is impressed upon the accelerating anode 43 of the cathode ray tube 6.

In the illustrated embodiment, the horizontal oscillator 11 comprises a cathode connected Hartley type oscillator circuit wherein the inductance 45 and condensers 46 and 47 form a tuned circuit which is resonant at the horizontal scanning frequency of 15,750 cycles, the cathode of the oscillator tube 48 being connected to a tap 49 on the inductance 45 to provide sufficient feedback for correct oscillator action. The frequency of the oscillator 11 may be varied by means of the potentiometer 50 which changes the effective capacitance of the tank circuit by a so-called resistance tuning of the tank circuit. Due to the narrow conduction angle of the oscillator, the anode current of the tube 48 is in the form of relatively narrow pulses which periodically discharge the condenser 51 so as to form a saw tooth voltage across the condenser 51 which is coupled through the condenser 52 and the resistors 53 and 54 to the control grid of the horizontal output tube 30. During the retrace or fly back intervals of the scanning wave, pulses of relatively high amplitude are developed at the anode of the tube 30 and these pulses are fed back through the condenser 25 to the balanced phase detector circuit 9. In the phase detector circuit 9 the synchronizing signal is compared with the feedback pulses and a substantially unidirectional control potential is derived which is impressed upon the oscillator control tube 10 so as to control the effective resistance thereof in series with the condenser 46. Accordingly, if the phase relationship between the synchronizing pulses and the horizontal oscillator 11 changes, the resistance of the control tube 10 varies in the correct direction to shift the phase of the oscillator 11 until it is in synchronism with the incoming synchronizing pulses.

Considering now the operation of the horizontal output tube 30 in relation to the regulation system of the present invention, it will be evident from the foregoing description that the anode of the tube 30 is energized from the power supply 24 which is connected in series with the boosted B+ voltage produced across the filter circuit 36. Accordingly, if the line voltage impressed upon the input terminals 23 of the power supply 24 decreases, the B+ voltage decreases by a corresponding amount with the result that a substantially smaller maximum anode current flows through the tube 30 and a substantially smaller amplitude pulse is produced across the high voltage winding 40 so that the accelerating anode potential impressed upon the accelerating anode 43 of the cathode ray tube 6 is likewise decreased. It will, therefore, be evident that when the line voltage decreases the brightness of the picture is correspondingly decreased and the electron beam within the tube 6 is defocused so that an unsatisfactory picture is obtained and several adjustments of the receiver are required to restore the picture to its original condition.

In order to regulate the operation of the horizontal output tube 30 so that the high voltage developed therefrom remains substantially constant despite wide variations in line voltage, the screen voltage of the horizontal output tube 30 is varied in the opposite direction from the corresponding line voltage variation so as to permit a substantially constant maximum anode current to be drawn from the tube 30. Furthermore, in accordance with the present invention the audio amplifier output tube 60 is employed as a D.C. amplifier to control the screen voltage of the horizontal output tube 30 so as to effect the above described screen voltage regulation without materially increasing the cost of the receiver. More particularly, the anode of the audio output tube 60 is connected through the primary winding 61 of the audio output transformer 17 to the screen grid of the horizontal output tube 30 and a load resistor 62 is connected from the screen grid of the tube 30 to the B+ terminal of the power supply 24. Since the resistor 62 is common to both the screen circuit of the tube 30 and the anode circuit of the tube 60, a change in the anode current of the tube 60 produces a corresponding variation in voltage across the resistor 62 and hence a change in the screen voltage of the horizontal output tube 30.

In order to cause the audio amplifier tube 60 to function as a D.C. amplifier and to produce a variation in the anode current thereof in response to variations in line voltage, a bias potential is applied to the control grid of the amplifier tube 60 which varies in accordance with changes in line voltage. However, since the cathode of the amplifier tube 60 is connected to ground the variable bias voltage required for the tube 60 must necessarily be negative with respect to ground so that the control grid of the tube 60 is biased to the correct point on the operating characteristic of the tube to permit audio amplification through the tube 60 without substantial distortion. Accordingly, there is provided a negative source of reference potential which is substantially independent of line voltage variations and a voltage divider network is connected between this constant reference potential and the B+ supply potential so as to provide a variable bias voltage for the control grid of the tube 60. In this connection it will be understood that if the negative reference potential is derived by rectification of the line voltage itself the bias voltage would change with line voltage variations and hence would not remain at a constant value. In accordance with a feature of the present invention the fixed negative reference potential is derived from the horizontal oscillator circuit 11 by rectifying the 15,750 cycle voltage which appears at the control grid of the oscillator tube 48. More particularly a resistor 65 and a small neon tube 66 are connected in series between the control grid of the oscillator tube 48 and ground so that a potential of approximately 60 volts negative with respect to ground is developed across the tube 66. A voltage divider consisting of the series connected resistors 67 and 68 is connected between the B+ conductor and the negative terminal of the neon tube 66, the values of the resistors 66 and 67 being so chosen that the correct bias potential for the control grid of the tube 60 is developed at the junction point of the resistors 67 and 68. The audio frequency signal from the amplifier 15 is coupled through the condenser 69 to the control grid of the audio output tube 60 and appears in amplified form across the primary winding 61 of the output transformer 17.

Considering now the operation of the regulation system of the present invention under conditions of changing line voltage, if the line voltage increases the B+ potential increases while the potential developed across the neon tube 66 remains substantially constant so that the bias potential impressed upon the control grid of the tube 60 increases with the result that the anode current of the audio output tube increases and a larger voltage drop is produced across the common load resistor 62. Accordingly, the screen voltage of the horizontal output tube decreases so that the maximum anode current which can be derived from the tube 30 remains substantially constant despite the increased B+ potential applied to the anode of this tube. The audio frequency signal developed across the primary winding 61 of the output transformer 17 is by-passed to ground by means of a relatively large by-pass condenser 70 so that no audio frequency voltage is impressed upon the screen grid of the horizontal output tube. With this arrangement, the horizontal scanning system is substantially independent from the audio signal channel although the audio output tube 60 is used to control the D.C. screen grid potential of the horizontal output tube 30. The condenser 70 also functions to prevent any 15,750 cycle signal produced in the horizontal deflection circuit from feeding into the audio output transformer 17.

If the line voltage decreases the B+ potential decreases by a corresponding amount while the voltage across the neon tube 66 remains substantially constant so that the grid potential of the tube 60 decreases and the static anode current of the tube 60 is reduced. When the current through the tube 60 is reduced the voltage drop across the common resistor 62 decreases so that the screen voltage of the horizontal output tube is increased and the current through the horizontal output tube 30 is stabilized. In this connection it will be understood that a relatively small current is drawn through the neon tube 66 so that voltage regulation can be effected by this tube at a relatively low power level, and, with the circuit arrangement of the present invention the audio output tube 60 produces a sufficiently large power amplification to permit control of the screen grid of the horizontal output tube. It will also be understood that the horizontal oscillator circuit 11 provides a particularly suitable source from which the fixed bias potential may be derived since the frequency of the oscillator circuit 11 does not vary with line voltage variations and the voltage developed at the control grid of the oscillator tube 48 is, to some extent, self-regulating due to the self-biasing grid circuit characteristic of the oscillator tube 48. However, it will be understood that the oscillator tube 48 has sufficient power to drive the low impedance load circuit presented by the neon tube 66 and sufficient feedback is provided by the coil 45 to insure oscillation under these load conditions.

A suitable energizing potential for the screen grid of the audio output tube 60 is provided by connecting the voltage divider resistors 75 and 76 between the B+ conductor and ground potential, the screen grid of the tube 60 being connected to the junction point of the resistors 75 and 76. However, in order not to introduce degeneration in the essentially D.C. regulating circuit for the horizontal output tube 30, the resistors 75 and 76 are of relatively small value so that a large bleeder current is drawn from the B+ supply through the resistors 75 and 76, the ratio of the resistor 75 to the resistor 76 being so chosen to provide rated screen potential for the tube 60. In this connection it will be understood that the screen grid bleeder network 75 and 76 may be eliminated by operating the screen grid of the tube 60 at ground potential and connecting the cathodes of the output tubes 30 and 60 to a B− potential which is negative with respect to ground. With such an arrangement the grounded elements of the horizontal oscillator circuit 11, the output stage 12 and the output stage 16, as well as the neon tube 66 would all be connected to the B− potential so that the voltage developed across the neon tube 66 would be 60 volts negative with respect to the B− potential.

Since the audio output tube 60 must amplify an audio signal without distortion and must, at the same time, function as a D.C. voltage regulator for the screen grid of the horizontal output tube 30, it is necessary that the audio output tube 60 have sufficient plate dissipation and cathode current to perform a satisfactory regulating operation when the line voltage is at its upper limit and while the audio signal is being amplified without distortion. A tube 60 of the commercial type 6Y6 has been found satisfactory to fulfill these requirements.

While the present invention has been described in connection with a system wherein the audio output tube is used to control the screen grid voltage of the horizontal output tube, it will be understood that any other suitable signal translating stage of the receiver having the required voltage and current characteristics may be employed as a D.C. amplifier to control the screen voltage of the horizontal output tube in the manner described in detail heretofore.

While there have been described what are at present considered to be the preferred embodiments of the invention, it will be understood that various modifications may be made therein which are within the true spirit and scope of the invention as defined in the appended claims.

What is claimed as new and is desired to be secured by Letters Patent of the United States is:

1. In a television receiver, a deflection output tube having an input electrode, a screen grid electrode and an anode, a source of energizing potential subject to variations due to line voltage fluctuations, means connecting said energizing potential to the anode of said deflection output tube, an amplifier tube having an input electrode and an output electrode, means for impressing an alternating current signal on the input electrode of said amplifier tube, means including a common load impedance for energizing the screen grid of said output tube and the output electrode of said amplifier tube from said energizing potenial, means for deriving said alternating current signal from the output electrode of said amplifier tube, and means for applying a bias potential to the input electrode of said amplifier tube which varies in accordance with line voltage fluctuations, thereby to vary the screen voltage of said output tube in opposition to said line voltage fluctuations.

2. In a television receiver, a deflection output tube, means for impressing an energizing potential on said output tube, said energizing potential varying with line voltage fluctuations, a signal translating tube having an input electrode and an output electrode, means for impressing an alternating current signal on the input electrode of said signal translating tube, means for deriving an alternating current signal from the output electrode of said signal translating tube, a scanning oscillator circuit, rectifier means for deriving a negative reference potential from said oscillator circuit which is substantially independent of line voltage variations, means including said negative reference potential for applying a negative bias potential to the input electrode of said signal translating tube which varies in accordance with line voltage variations, means for deriving from the output electrode of said signal translating tube a control potential corresponding to said bias potential variations, and means for impressing said control potential on a control electrode of said output tube to minimize effects of variations in said energizing potential due to line voltage fluctuations.

3. In a television receiver, a deflection output tube, means for impressing an energizing potential on said output tube, said energizing potential varying with line voltage fluctuations, a signal translating tube having an input electrode, a cathode, and an output electrode, means for impressing an alternating current signal on the input electrode of said signal translating tube, means for deriving an alternating current signal from the output electrode of said signal translating tube, a scanning oscillator tube having a self-biasing control grid circuit, means for deriving from said control grid circuit a reference potential which is negative with respect to the cathode potential of said signal translating tube and which is substantially independent of line voltage variations, means including a voltage divider network connected between said reference potential and said energizing potential for applying a bias potential to the input electrode of said signal translating tube which is negative with respect to the cathode potential of said signal translating tube and varies in accordance with line voltage variations, means for deriving from the output electrode of said signal translating tube a control potential corresponding to said bias voltage variations, and means for impressing said control potential on a control electrode of said output tube to minimize effects of variations in said energizing potential due to line voltage fluctuations.

4. In a television receiver, a horizontal deflection amplifier, a horizontal oscillator, means connecting an output of said oscillator to said amplifier, means for rectifying at least a portion of an output signal from said oscillator to provide a substantially fixed unidirectional biasing voltage of predetermined value, an amplifier tube for amplifying an alternating current signal supplied to the input thereof, means responsive to alternating current signal components in the output of said tube for coupling said components to a load, means for utilizing said unidirectional biasing voltage to provide a bias on said input to control the operating point on the characteristic of said amplifier tube, a source of direct current energization voltage having a value varying with line voltage fluctuations, means utilizing said source for energizing said horizontal deflection amplifier, means for impressing a predetermined portion of said energization voltage on the input circuit of said tube, and means responsive to the current level of the direct current in the output circuit of said amplifier for adjusting a bias voltage on said deflection amplifier to offset effects on the output signal from said deflection amplifier caused by variations in value of the unidirectional voltage from said source.

5. The combination set forth in claim 4 wherein said last-named means comprises a common load resistor serially connected between said source and the anode of said amplifier tube the screen grid of said deflection amplifier being connected to the end of said resistor which is remote from the anode of said amplifier tube, said alternating current signal is an audio signal, and an audio bypass capacitor is connected across the screen grid input circuit of said deflection amplifier.

6. In a television receiver, a deflection output tube having an anode and a screen grid; means for supplying anode potential to the anode of said output tube, said anode potential varying with line voltage fluctuations; an audio amplifier tube having an input electrode, a cathode, and an output electrode; means for impressing an audio frequency signal on the input electrode of said audio amplifier tube; means for deriving an audio frequency signal from the output electrode of said audio amplifier tube; a horizontal frequency scanning oscillator tube having a self-biasing control grid circuit; means for deriving from said control grid circuit a reference potential which is negative with respect to the cathode potential of said audio amplifier tube and which is substantially independent of line voltage variations; means, including a voltage divider network connected between said means for deriving said reference potential and said means for supplying said anode potential, for applying a bias potential to the input electrode of said audio amplifier tube which bias potential is negative with respect to the cathode potential of said audio amplifier tube and varies in accordance with line voltage variations; a resistor connected between said means for supplying anode potential and the screen grid of said deflection output tube; and, a connection from the anode of said audio amplifier tube to said screen grid, whereby changes in direct current flow through said audio amplifier, produced by line voltage fluctuations, regulate the voltage on the screen grid of said deflection output tube.

7. In a television receiver, a deflection output tube having an anode and a screen grid; means for supplying anode potential to the anode of said output tube, said anode potential varying with line votlage fluctuations; an audio amplifier tube having an input electrode, a screening electrode, a cathode, and an output electrode; means for impressing an audio frequency signal on the input electrode of said audio amplifier tube; means for deriving an audio frequency signal from the output electrode of said audio amplifier tube; a horizontal frequency scanning oscillator tube having a self-biasing control grid circuit, means, including a two electrode gas-filled tube, for deriving from said control grid circuit a reference potential which is negative with respect to the cathode potential of said audio amplifier tube and which is substantially independent of line voltage variations; means, including a voltage divider network connected between said means for deriving said reference potential and said means for supplying said anode potential, for applying a bias potential to the input electrode of said audio amplifier tube which bias potential is negative with respect to the cathode potential of said signal translating tube and varies in accordance with line voltage variations; a resistor connected between said means for supplying anode potential and the screen grid of said deflection output tube; an audio frequency coil connecting the anode of said audio amplifier tube to the screen grid of said deflection output tube, whereby changes in direct current flow through said audio amplifier, produced by line voltage fluctuations, regulate the voltage on the screen grid of said deflection output tube; a relatively low resistance voltage dividing network connecting the cathode of said audio amplifier tube to said means for supplying anode potential and a connection from the screening electrode of said audio amplifier tube to an intermediate point on said network.

References Cited in the file of this patent

UNITED STATES PATENTS

| | | |
|---|---|---|
| 2,579,627 | Tourshou | Dec. 25, 1951 |
| 2,651,002 | De Cola | Sept. 1, 1953 |
| 2,697,798 | Schlesinger | Dec. 21, 1954 |
| 2,728,875 | Kihn | Dec. 27, 1955 |